(12) United States Patent
Smith

(10) Patent No.: US 10,619,723 B2
(45) Date of Patent: Apr. 14, 2020

(54) TOOLS AND METHOD FOR INSTALLATION OF A TRANSMISSION SHIFT CABLE BUSHING

(71) Applicant: Loring Smith, Lakeland, FL (US)

(72) Inventor: Loring Smith, Lakeland, FL (US)

( * ) Notice: Subject to any disclaimer, the term of this patent is extended or adjusted under 35 U.S.C. 154(b) by 242 days.

(21) Appl. No.: 15/658,649

(22) Filed: Jul. 25, 2017

(65) Prior Publication Data

US 2017/0321797 A1 Nov. 9, 2017

Related U.S. Application Data

(62) Division of application No. 14/278,400, filed on May 15, 2014, now abandoned.

(51) Int. Cl.
| | |
|---|---|
| *F16H 59/04* | (2006.01) |
| *F16C 1/14* | (2006.01) |
| *F16H 61/36* | (2006.01) |
| *F16C 43/02* | (2006.01) |
| *F16H 57/00* | (2012.01) |

(52) U.S. Cl.
CPC ............. *F16H 59/042* (2013.01); *F16C 1/14* (2013.01); *F16C 1/145* (2013.01); *F16C 43/02* (2013.01); *F16H 59/04* (2013.01); *F16H 61/36* (2013.01); *F16H 2057/0062* (2013.01); *Y10T 29/49698* (2015.01); *Y10T 29/53913* (2015.01)

(58) Field of Classification Search
CPC ........................ F16H 59/042; Y10T 29/53913
See application file for complete search history.

*Primary Examiner* — Jason J Vaughan
*Assistant Examiner* — Amanda Kreiling
(74) *Attorney, Agent, or Firm* — Todd Jennings

(57) ABSTRACT

Installation of a bushing into the shift cable end of an automatic transmission, without replacing the entire shift cable end, is accomplished via methods and specialized tools that do not divert the force applied by compressive tools away from the non-load-bearing surfaces of the bushing and shift cable end, and maintain the axial alignment of the bushing with the shift cable end during installation, thus preventing deformation of the shift cable end and bushing during installation, and ensuring the proper coupling of the shift cable end and shift lever. In particular embodiments, a shift cable end protective member is secured to the shift cable end, a bushing installation member is inserted into the bushing, through the shift cable end and into the protective member, and a compressive force is applied simultaneously to the protective member and installation member, thus pressing the bushing into place within the shift cable end. The protective member and installation member work in tandem to divert the compressive force away from the shift cable end, average the compressive force across the bushing, and maintain the alignment of the bushing with the shift cable end as the bushing is pressed into the shift cable end.

10 Claims, 4 Drawing Sheets

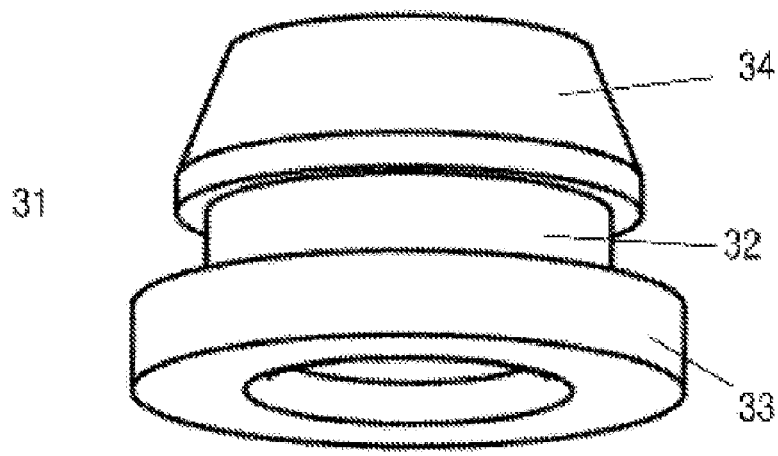
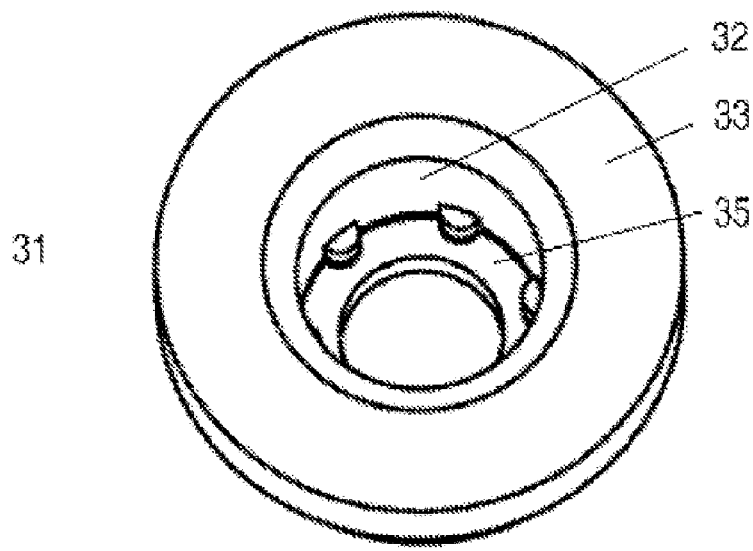

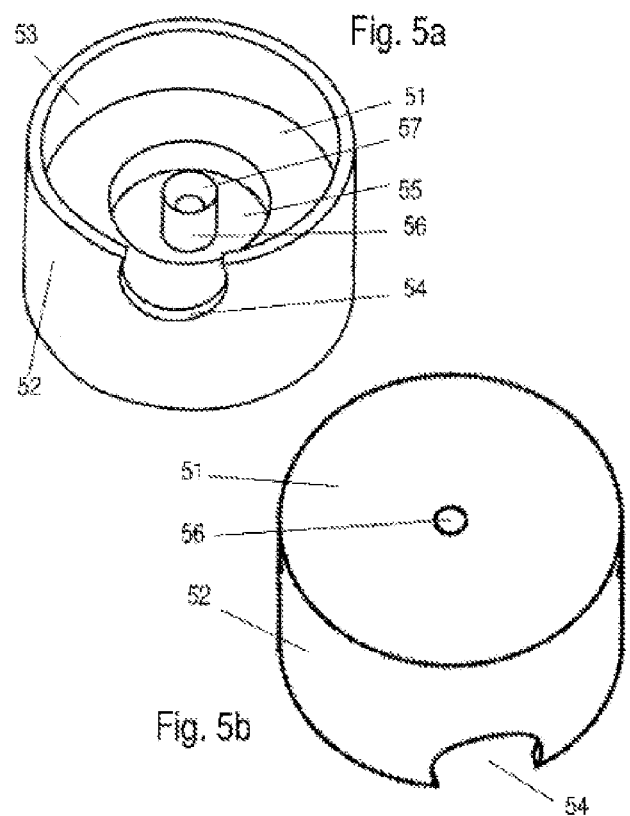
Fig. 5a
Fig. 5b
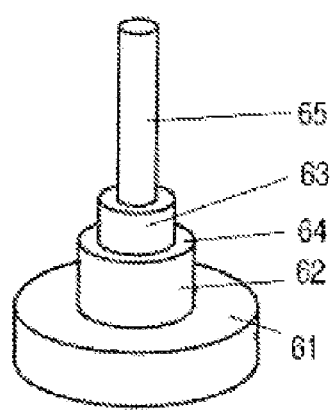
Fig. 6

TOOLS AND METHOD FOR INSTALLATION OF A TRANSMISSION SHIFT CABLE BUSHING

(B) CROSS-REFERENCES TO RELATED APPLICATIONS

This application is a divisional application of application Ser. No. 14/278,400, filed May 14, 2014. The foregoing application is incorporated herein by reference in its entirety.

(C) STATEMENT REGARDING FEDERALLY SPONSORED RESEARCH

Not Applicable.

(D) NAMES OF PARTIES TO JOINT RESEARCH AGREEMENT

Not Applicable

(E) REFERENCE TO A SEQUENCE LISTING

Not Applicable.

(F) BACKGROUND OF THE INVENTION

(1) Field of Invention

The present invention comprises a method for installing a bushing into the end of a transmission shift control linkage of various motor vehicles without damaging the shift cable end or the bushing. The transmission shift control linkage of many motor vehicles generally consists of a shift cable that connects the gear selector or shift lever to the motor vehicle's transmission. The shift cable end is coupled with the gear selector or shift lever via a bushing that allows for the smooth operation of the shift linkage. The bushing installed in the shift cable end of various motor vehicles consists of plastic that dries, rots and becomes brittle over time. The degradation or failure of the bushing allows the shift cable end to become decoupled from the gear selector or shift lever, making it impossible for the operator of the automobile to engage the shift and the transmission.

Presently, the failure of a transmission shift cable end bushing in various motor vehicles requires the removal and replacement of the entire shift cable. This is because the replacement of factory-installed bushings by mechanics generally involves methods utilizing conventional or makeshift tools that deform or otherwise damage the shift cable end or bushing during installation, and fail to properly align the bushing with the shift cable end during installation. This results in a sub-standard repair that may not properly couple the shift cable end with the shift lever. Also, degraded factory-installed bushings are occasionally replaced with non-factory, "universal" bushings. Such bushings are not necessarily intended or tailored for any specific application and, when installed, often fail to properly engage the shift cable end, resulting in a sub-standard repair that may not properly couple the shift cable end with the shift lever. Additionally, the supply and labor costs associated with the replacement of the entire shift cable assembly are substantially greater than the supply and labor costs associated with the replacement of the shift cable bushing.

(1) Background Art

There are several bushing installation tools and methods for installing bushings into various housings, including machine housings associated with the internal components of an automatic transmission. An example of such a tool is shown in U.S. Pat. App. No. US2008/0066281, which discloses a pair of linkage bushing installation pliers that operates by coaxially forcing a linkage bushing into the receiving aperture of a machine housing. While such devices fulfill their particular purposes, the application of such tools to the problem of installing a shift cable end bushing without replacing the entire shift cable assembly is akin to using conventional or makeshift tools, which may deform or damage the shift cable end or bushing, resulting in a sub-standard repair that may not properly couple the shift cable end with the shift lever.

(G) SUMMARY OF THE INVENTION

Accordingly, it is the object of the present invention to provide specialized tools and methods of use for the prompt installation of a factory bushing or the equivalent into the transmission shift cable end that does not damage the shift cable end or the bushing, maintains the alignment of the bushing with the shift cable end during the installation, ensures the proper coupling of the shift cable end and shift lever, and avoids the need of replacing the entire shift cable. In accordance with the invention, the proper installation of a transmission shift cable end bushing is achieved by methods utilizing specialized tools that allow for the prompt installation of the bushing that divert the force applied from compression tools during installation to the load-bearing surface of the shift cable end, average an applied compressive force across the bushing, and ensure the axial alignment of the bushing with the shift cable end throughout the installation.

In particular embodiments of the invention, the object of the invention may be accomplished by securing a shift cable end protective tool onto one side of the shift cable end, inserting a bushing installation tool into the bushing, guiding the installation tool through the shift cable end and into the protective tool, simultaneously applying a force to the outer surfaces of the protective tool and installation tool, and removing the protective and installation tools, thereby securing the bushing in the shift cable end bushing housing. Such an installation tool may, for example, be comprised of a cylindrical member including a series of elongated and concentric members of decreasing diameter extending perpendicularly from its center which engages the bushing, diverts the force applied by a compression tool away from the inner annular surface of the bushing and averages such a force across the trailing shoulder of the bushing, and engages the protective tool to maintain the axial alignment of the bushing during installation.

The protective tool may be comprised of a cylindrical member with a securing means, or annular surface extending perpendicularly around its circumference for securing onto the shift cable end, a force-diverting means or cavity for housing the fragile members of the shift cable end and allowing the cylindrical member to contact the load-bearing, flat annular surface of the shift cable end, and an alignment means, or sleeve extending perpendicularly from the center of the cavity to allow for the axial alignment of the installation tool with the shift cable end. The securing means may carry a gripping means for gripping onto the connecting member that connects the shift cable end to the shift cable. Additionally, a n alignment sleeve may carry a conical guiding surface for guiding the installation tool into the sleeve during installation. The protective tool and installation tool can be composed of any metal, polymer or copolymer capable of withstanding the physical force applied by a compression tool, such as, for example, acrylonitrile-butadiene-styrene.

DESCRIPTION OF THE DRAWINGS

FIG. 3a is a perspective side view of an exemplary bushing installed in the shift cable end of FIG. 1

FIG. 3b is a perspective view of the bushing in FIG. 3a.

FIG. 5a is a perspective illustration of an exemplary shift cable end protective tool for use in installing the bushing in FIG. 3a into the shift cable end of FIG. 1.

FIG. 5b is a perspective illustration of the bottom of the shift cable end protective tool of FIG. 5a.

FIG. 6 is a perspective illustration of an exemplary bushing installation tool for use in installing the bushing in FIG. 3a into the shift cable end of FIG. 1.

(I) DETAILED DESCRIPTION

The degradation of a factory-installed bushing or the equivalent in the shift cable end of various motor vehicles requires the replacement of the entire shift cable, wherein the new shift cable is pre-fitted with a factory bushing or the equivalent. The replacement of the entire shift cable as a means of installing a shift cable bushing is the generally accepted method because there is no known method for the installation of a factory bushing or the equivalent that ensures the proper coupling of the shift cable and shift lever, maintains the alignment of the bushing with the shift cable end during installation, and prevents the shift cable end and bushing from being damaged during installation.

As noted above, it remained for the present inventor to recognize that devising a method and tools for the installation of a bushing into a transmission shift cable end would provide a number of benefits, including lower supply and labor costs. The present inventor further recognized that the proper installation of a shift cable end bushing in various motor vehicles could be achieved by developing a method and specialized tools that divert the force applied from compression tools away from the non-load-bearing members of the bushing and shift cable end, while simultaneously ensuring the axial alignment of the bushing with the shift cable end and the proper coupling of the shift cable and shift lever or gear selector.

Figure 1:
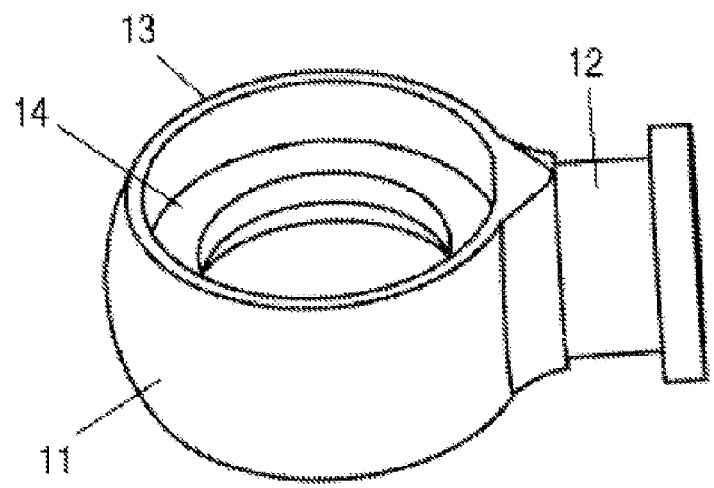
FIG. 1 is a perspective illustration showing the details of an exemplary shift cable end.
Figure 2:
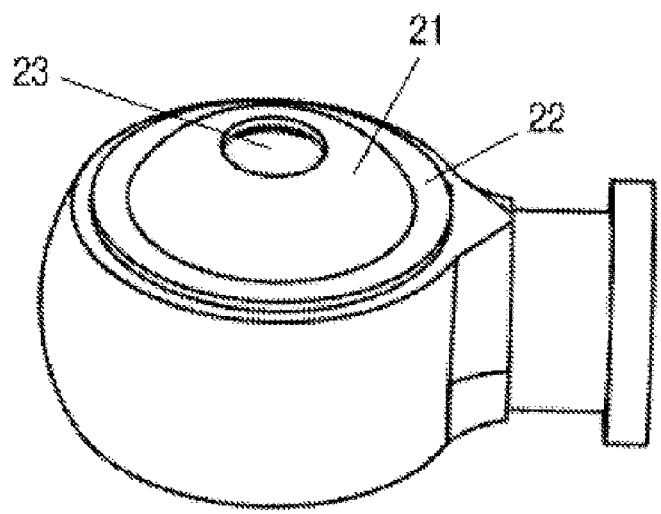
FIG. 2 is a perspective illustration showing the details of the bottom of the shift cable end of FIG. 1.

Referring to FIGS. 1a and 1b, an exemplary transmission shift cable end 11 for a motor vehicle (not shown) is illustrated. The shift cable end 11 operably couples the shift lever (not shown) with the shift cable (not shown) and allows the shift lever to engage the transmission (not shown). This particular example of a shift cable end 11 includes a connecting member 12 that connects the shift cable to the shift cable end 11, and a coupling aperture 13 extending through the shift cable end 11 and adapted to couple with the coupling member (not shown) of the shift lever. The coupling aperture 13 carries a mounting aperture 14 that secures a bushing by compression fit. The shift cable end 11 (FIG. 2) further includes a semi-spherical member 21 extending longitudinally from the rear surface 22 of the shift cable end 11 and a concentric aperture 23 forming a spherical cap on the semi-spherical member 21.

In this example (FIG. 3), the bushing 31 includes a sleeve 32 with shoulders extending radially from both ends. The trailing shoulder 33 engages the mounting aperture while the leading shoulder 33 extends through and beyond the mounting aperture 14 to hold the bushing 31 in place. When installed, the leading shoulder 34 of the bushing 31 is housed within the semi-spherical member 21 of the shift cable end 11. The bushing sleeve 32 carries an inner annular member 35 that engages the coupling member of the shift lever or gear lever. The shift cable end 11 and shift lever or gear lever are coupled by inserting the coupling member of the shift lever or gear lever into the coupling aperture 13 and through the bushing 31.

Figure 4:
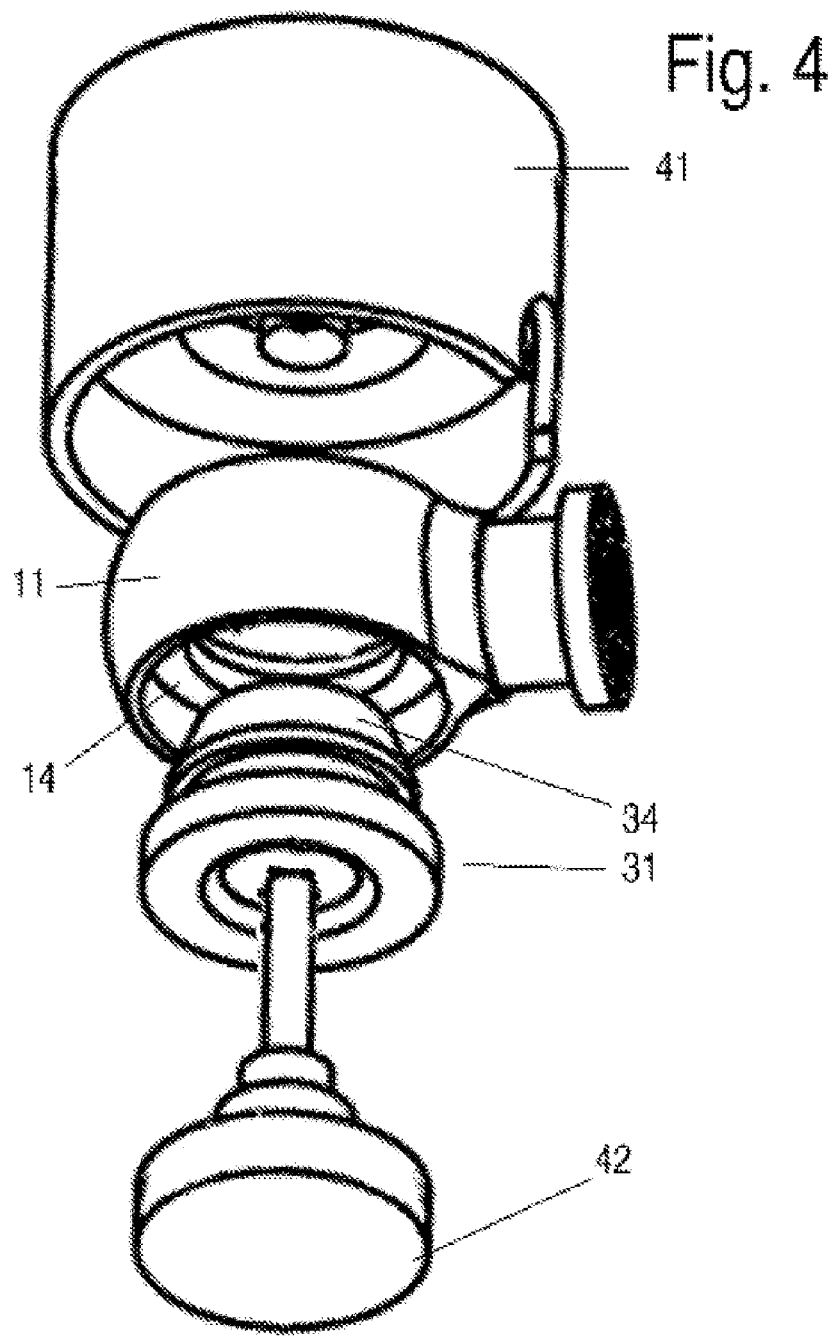
FIG. 4 is an exploded perspective illustration of an exemplary method and tools, according to the present invention, for installing the bushing in FIG. 3 into the shift cable end of FIG. 1.

In accordance with the present invention, FIG. 4 illustrates an example of a method to divert the force applied from a compression tool, such as pliers, away from the non-load-bearing members of the shift cable end 11, while simultaneously ensuring the axial alignment of the bushing 31 with the shift cable end 11 and the proper coupling of the shift cable end and shift lever. In this particular method (FIG. 4), a protective means, embodied here as a shift cable end protective tool 41 is secured onto the shift cable end 11. A force-averaging means, embodied here as a bushing installation tool 42, is inserted into the bushing 31, and the bushing installation tool 42 is guided through the shift cable end 11 and into the shift cable end protective tool 41. A compressive force is then applied simultaneously to the shift cable end protective tool 41 and the bushing installation tool 42 with an appropriate compressive tool (not shown), such as pliers, until the leading shoulder 34 of the bushing 31 is inserted through and beyond the mounting aperture 14. The shift cable end protective tool 41 and bushing installation tool 42 are then removed, leaving the bushing 31 installed in the shift cable end 11.

An example of a shift cable end protective tool 41 is illustrated in FIG. 5a and FIG. 5b. The shift cable end protective tool 41 is comprised of a cylindrical seating member 51 including a securing means 52 for securing onto the shift cable end 11, said securing means 52 comprising an outer cylindrical peripheral surface 53 extending longitudinally from the cylindrical member 51, the cylindrical peripheral surface 53 including a gripping means for grasping and securing onto the shift cable end 11. In this particular embodiment, the gripping means is comprised of a semi-circular opening 54 of a diameter marginally greater than the diameter of the shift cable end connecting member 12, such that the semi-circular opening 54 within the cylindrical peripheral surface 53 grasps the outer surface of the shift cable end connecting member 12, and secures the shift cable end protective tool 41 to the shift cable end 11 during installation.

This particular embodiment of a shift cable end protective tool 41 further includes a means for diverting the force applied by a compression tool, such as pliers, away from the semi-spherical member 21 of the shift cable end 11, and to the rear surface 22 of the shift cable end 11, said force-diverting means comprising an annular cavity 55 with a diameter slightly greater than the diameter of the semi-spherical member 21 and a depth slightly greater than the distance between the rear surface 22 of the shift cable end 11 and the concentric aperture 23 of the semi-spherical member 21, whereby the shift cable end protective tool 41 does not make contact with the semi-spherical member 21 during installation of the bushing 31. A compressive force applied to the shift cable end protective tool 41 is thereby diverted to the rear surface 22 of the shift cable end 11.

This example of a shift cable end protective tool further includes an alignment means to ensure the alignment of the bushing 31 with the shift cable end 11 during installation, said alignment means comprising an alignment sleeve 56 centered longitudinally within the annular cavity 55, wherein the bushing installation tool 42 is inserted during installation, thereby aligning the bushing 31 within the shift cable end 11. The alignment sleeve 56 includes a conical guiding surface 57 that guides the bushing installation tool 42 into the alignment sleeve 56 during installation.

An exemplary illustration of a force-averaging bushing installation tool is provided in FIG. 6. Such an installation tool is comprised of a cylindrical bushing seating member 61 that engages the trailing shoulder 33 of the bushing 31, and carries a series of alignment means, illustrated here as concentric members of decreasing diameter extending perpendicularly from its center. This particular installation tool comprises three such members. The first is an outer alignment member 62 of a diameter slightly less than the diameter of the bushing sleeve 32 such that the outer alignment member 62 engages the bushing sleeve 32 and maintains the alignment of the bushing sleeve 32 with the bushing installation tool 42 during installation. The outer alignment member 62 extends from the cylindrical member 61 and is of a length slightly less than the distance between the inner annular member 35 of the bushing 31 and the trailing shoulder 33 of the bushing 31, thereby preventing the bushing installation tool 42 from contacting the non-load-bearing inner annular member 35 of the bushing 31 during installation. As a compressive force is applied to the bushing installation tool 42 and shift cable end protective too141, the combination of cylindrical member 61 and the outer alignment member 62 diverts the force away from the bushing sleeve 32 and inner annular member 35 and onto the trailing shoulder 33 of the bushing 31.

The second member is an inner alignment member 63 that maintains the alignment of the inner annular member 35 and leading shoulder 34 of the bushing 31 with the bushing installation tool 42 during installation. The inner alignment member 63 is of a diameter less than the diameter of the inner annular member 35 and extends from the leading surface 64 of the outer alignment member 62 to the leading edge of the inner annular member 35, thereby aligning the bushing 31 with the bushing installation tool 42 during installation. The third member is a bushing installation tool alignment member 65 that maintains the axial alignment of the bushing installation tool 42 with the shift cable end protective tool 41 and shift cable end 11 during installation. The bushing installation tool alignment member 65 is inserted into the alignment sleeve 56 of the shift cable end protective tool 41, thereby maintaining the alignment of the bushing installation tool 42, and thus the bushing 31, with the shift cable end protective tool 41 and shift cable end 11 as a compressive force is applied to press the leading shoulder 34 of the bushing 31 through the mounting aperture 14 and into the semi-spherical member 21.

A system comprising both a shift cable end protective tool and a bushing installation tool may be made of any metal, polymer, copolymer or other material capable of being molded for the particular application and capable of withstanding the physical force applied by a compression tool, such as pliers. The shift cable end protective tool 41 and bushing installation tool 42 of the illustrative embodiment are made of acrylonitrile-butadiene-styrene.

The invention claimed is:

1. An apparatus for installation of a bushing into a control cable end, said control cable end having a coupling aperture extending through the control cable end, a mounting aperture carried in the coupling aperture, a semi-spherical member extending axially from the rear surface of the control cable end, said semi-spherical member having a concentric aperture, a cylindrical member extending from the circumferential surface of the control cable end, said bushing having a sleeve carrying a leading and trailing shoulder and having an aperture running the length of the sleeve, said aperture carrying an inner annular ridge, comprising:
   a control cable end protective member having a first side and second side;
   a peripheral surface extending from the first side of the protective member, said peripheral surface carrying an opening;
   a cavity in the first side of the protective member;
   a sleeve centered in the cavity;
   a bushing seating member having a first side and a second side;
   a first alignment member extending axially from the bushing seating member;
   a second alignment member extending axially from the first alignment member;
   a third alignment member extending axially from the second alignment member.

2. An apparatus for installation of a bushing into a control cable end, said control cable end having a coupling aperture extending through the control cable end, a mounting aperture carried in the coupling aperture, a semi-spherical member extending axially from the rear surface of the control cable end, said semi-spherical member having a concentric aperture, a cylindrical member extending from the circumferential surface of the control cable end, said bushing having a sleeve carrying a leading and trailing shoulder and having an aperture running the length of the sleeve, said aperture carrying an inner annular ridge, comprising:
   a control cable end protective member having a first side and second side;
   a peripheral surface extending from the first side of the protective member, said peripheral surface carrying an opening;
   an annular cavity in the first side of the seating member;
   a cylindrical sleeve centered in the annular cavity;
   a bushing seating member having a first side and a second side;
   a first cylindrical member extending axially from the bushing seating member;
   a second cylindrical member extending axially from the first cylindrical member;
   a third cylindrical member extending axially from the second cylindrical member.

3. An apparatus as in claim 2 wherein the peripheral annular surface is of a diameter greater than the outer diameter of the control cable end.

4. An apparatus as in claim 2 wherein the semi-circular opening is of a diameter marginally greater than the diameter of the cylindrical member extending from the circumferential surface of the control cable end.

5. An apparatus as in claim 2 wherein the annular cavity is of a diameter greater than the diameter of the semi-spherical member and a height greater than the distance between the rear surface of the shift cable end and the concentric aperture atop the semi-spherical member.

6. An apparatus as in claim 5 wherein the cylindrical sleeve centered in the annular cavity has an inner diameter slightly greater than the diameter of the second cylindrical member extending from the bushing seating member.

7. An apparatus as in claim 6 wherein the cylindrical sleeve carries a conical guiding surface that extends radially outward from the inner diameter to the outer diameter of the cylindrical sleeve.

8. An apparatus as in claim 2 wherein the first cylindrical member extending from the bushing seating member is of a diameter less than the diameter of the aperture running through the sleeve of the bushing, and of a length less than the distance from between the trailing shoulder and inner annular ridge of the bushing.

9. An apparatus as in claim 8 wherein the second cylindrical member extending from the first cylindrical member is of a diameter less than the diameter of the inner annular ridge of the bushing, and of a length less than the distance from the inner annular ridge to the outer surface of the leading shoulder of the bushing.

10. An apparatus as in claim 9 wherein the third cylindrical member extending from the second cylindrical member is of a diameter less than the diameter of the cylindrical sleeve in the annular cavity.

* * * * *